Jan. 9, 1951  K. C. JENNE  2,537,931
MECHANISM FOR GALVANIZING
Filed Jan. 23, 1948  10 Sheets-Sheet 2

Inventor
Kenneth C. Jenne
By Rockwell-Bartholow
Attorneys

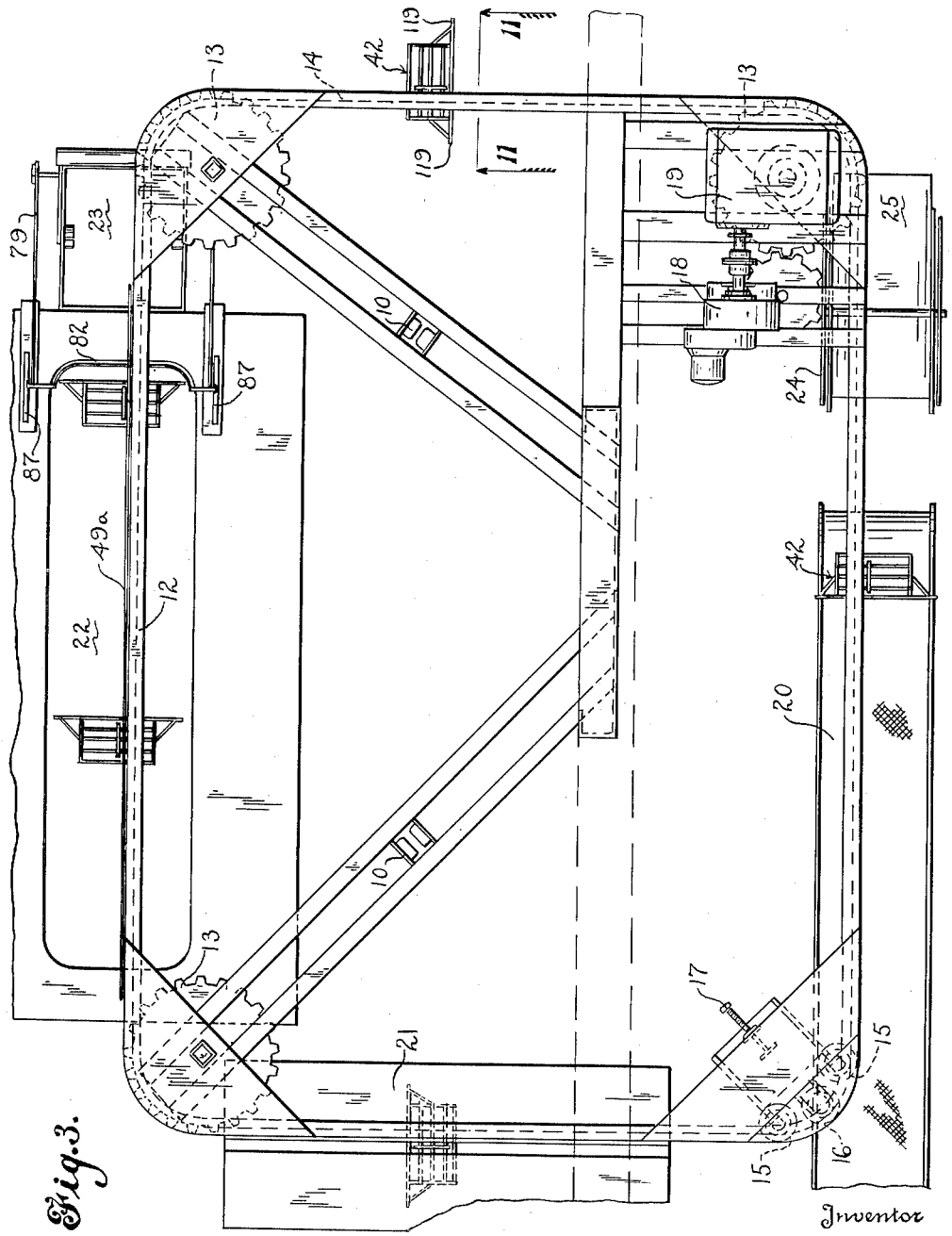

Jan. 9, 1951 K. C. JENNE 2,537,931
MECHANISM FOR GALVANIZING
Filed Jan. 23, 1948 10 Sheets-Sheet 4
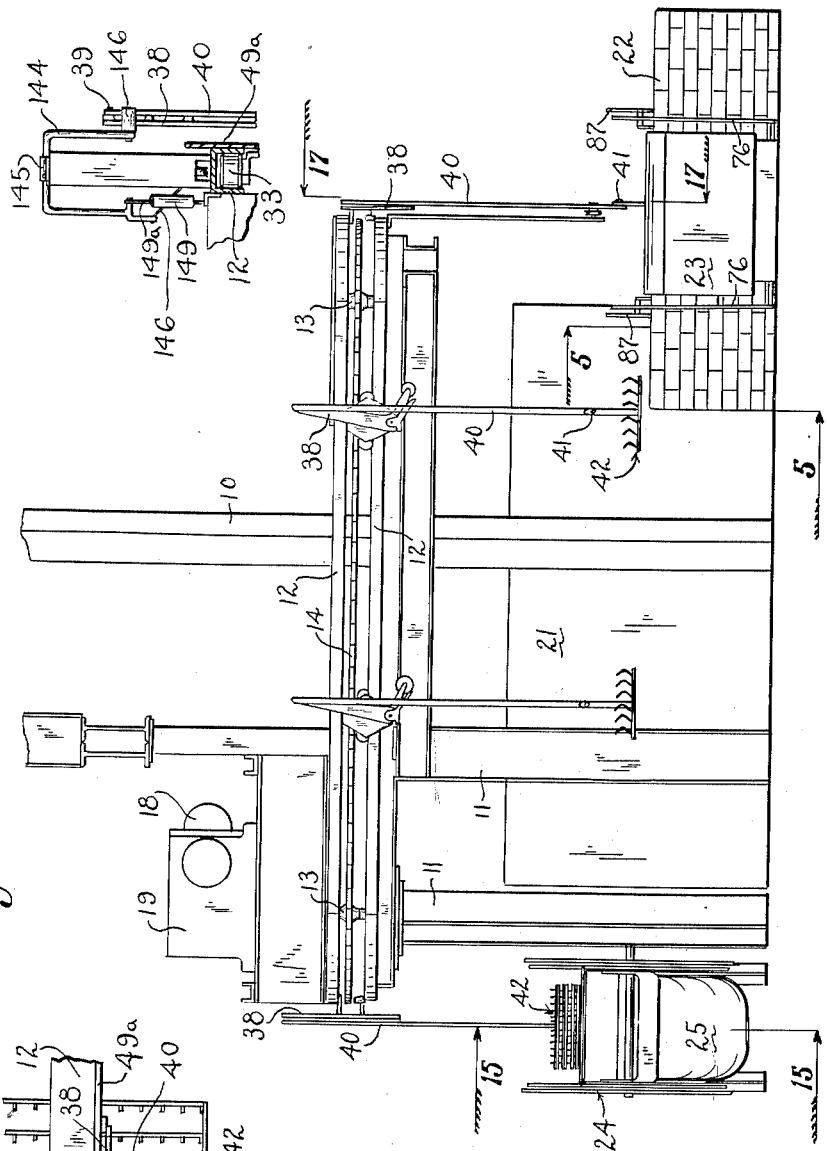
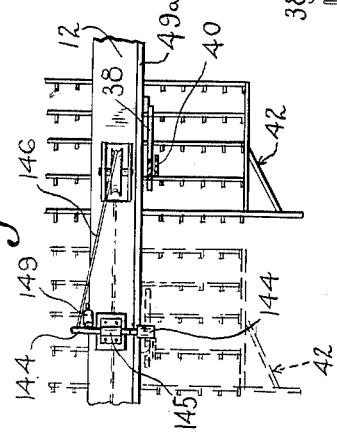
Inventor
Kenneth C. Jenne
By Rockwell-Bartholow
Attorneys Jan. 9, 1951 K. C. JENNE 2,537,931
MECHANISM FOR GALVANIZING
Filed Jan. 23, 1948 10 Sheets-Sheet 5
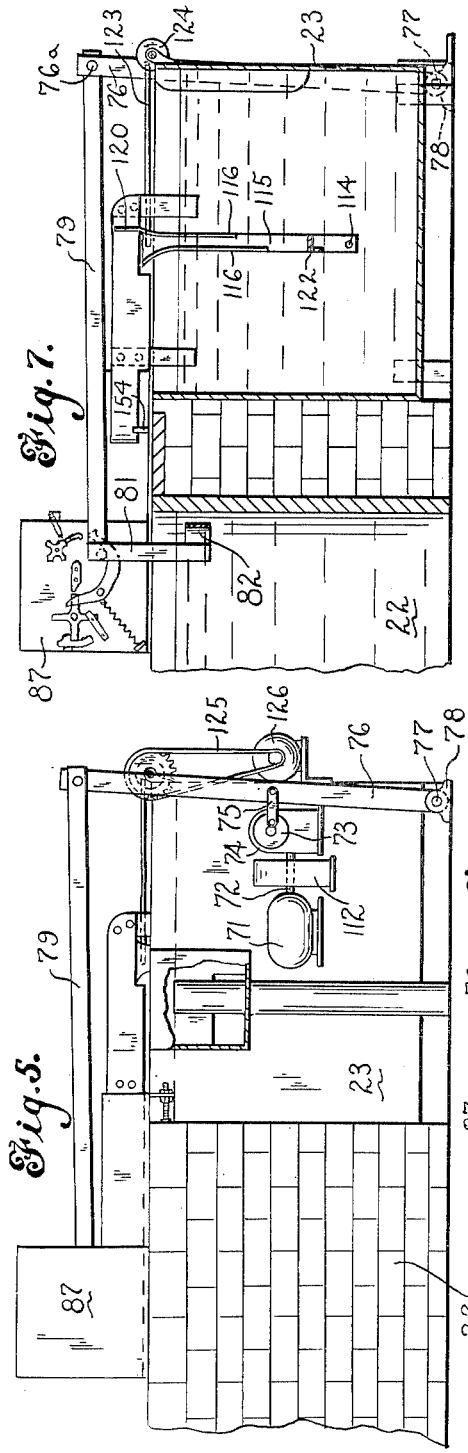
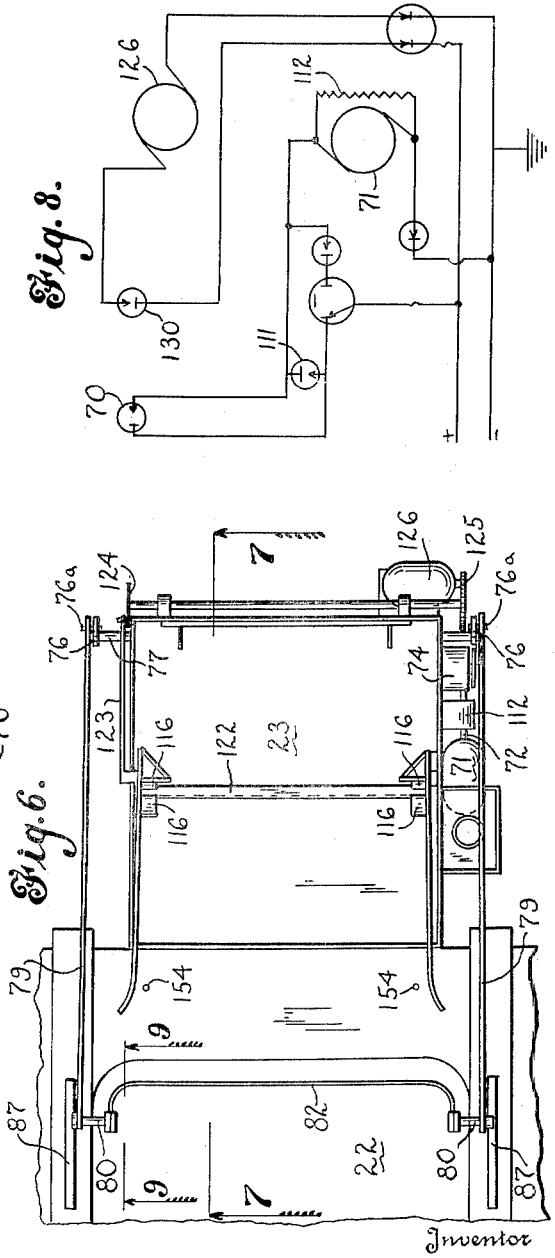
Inventor
Kenneth C. Jenne
By Rockwell & Buchholz
Attorneys Jan. 9, 1951 K. C. JENNE 2,537,931
MECHANISM FOR GALVANIZING
Filed Jan. 23, 1948 10 Sheets-Sheet 6
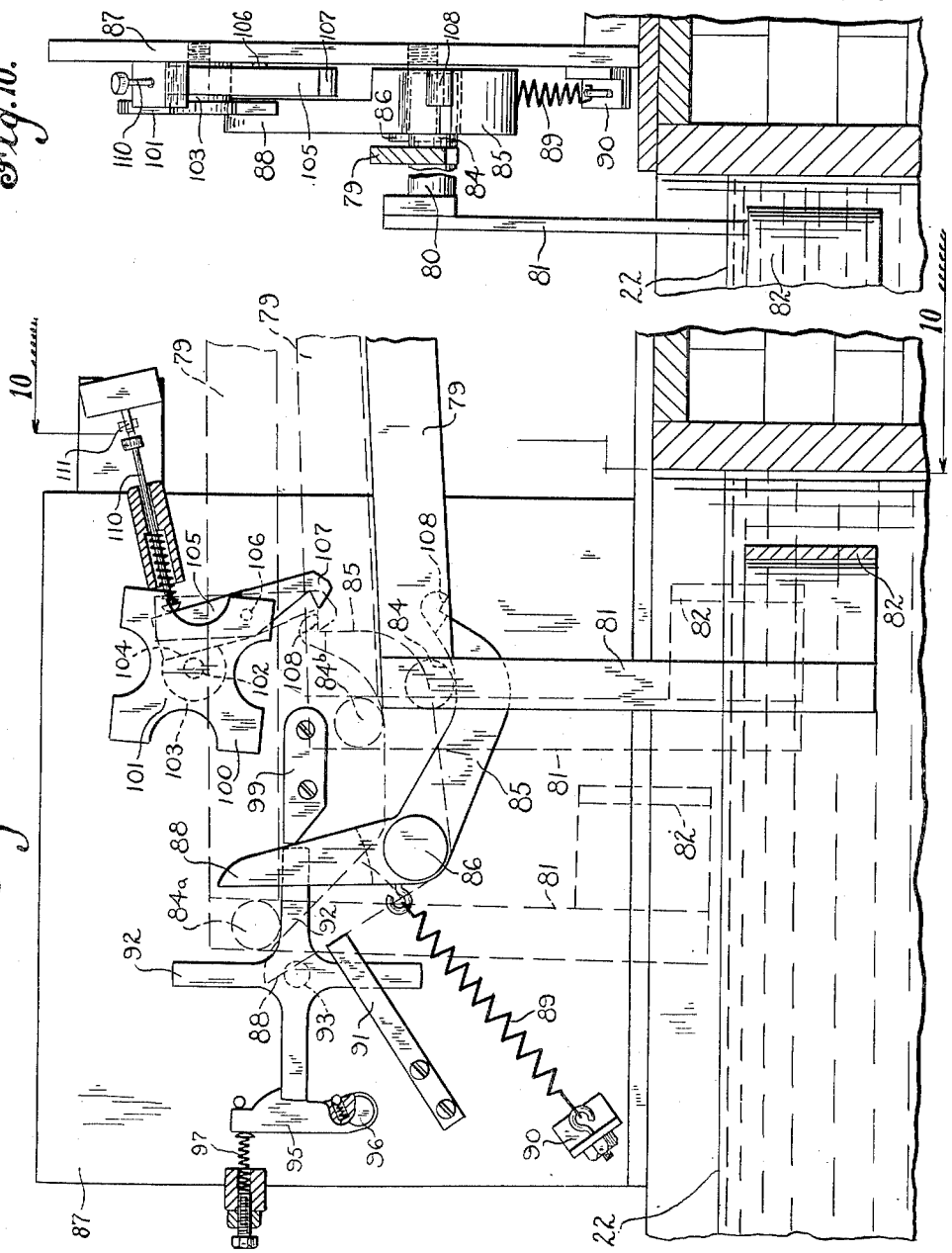
Inventor
Kenneth C. Jenne
By Rockwell-Bartholow
Attorneys Jan. 9, 1951 K. C. JENNE 2,537,931
MECHANISM FOR GALVANIZING
Filed Jan. 23, 1948 10 Sheets-Sheet 7
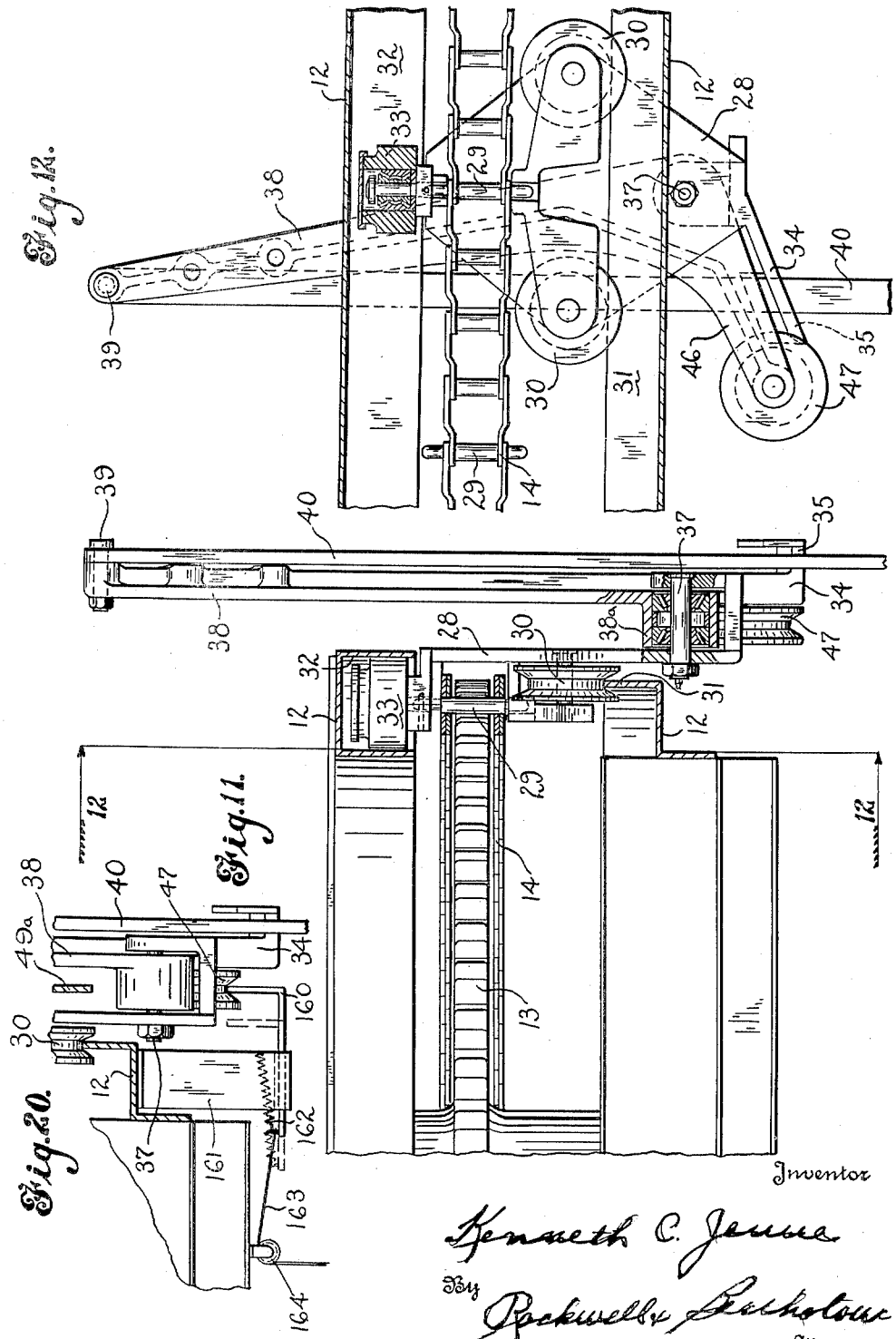
Inventor
Kenneth C. Jenne
By Rockwell & Bacholour
Attorneys

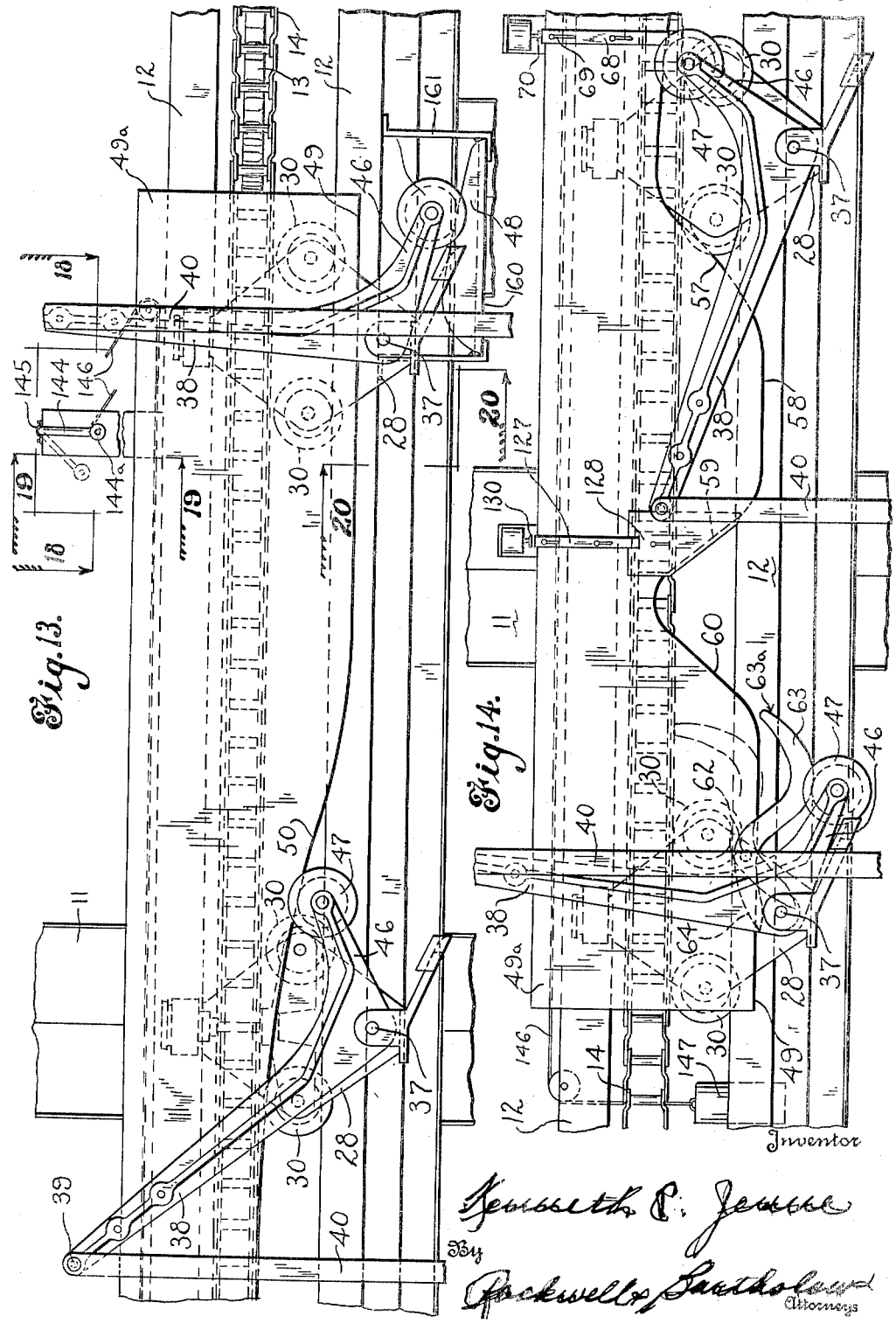

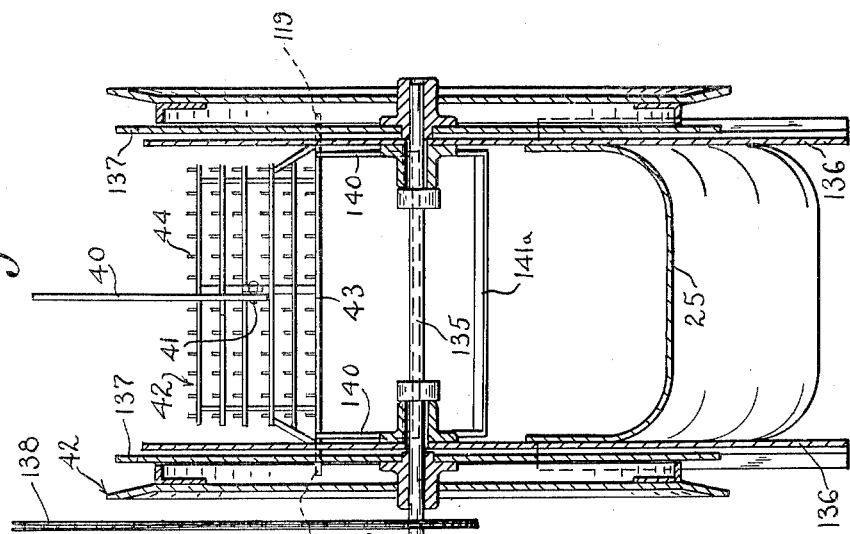

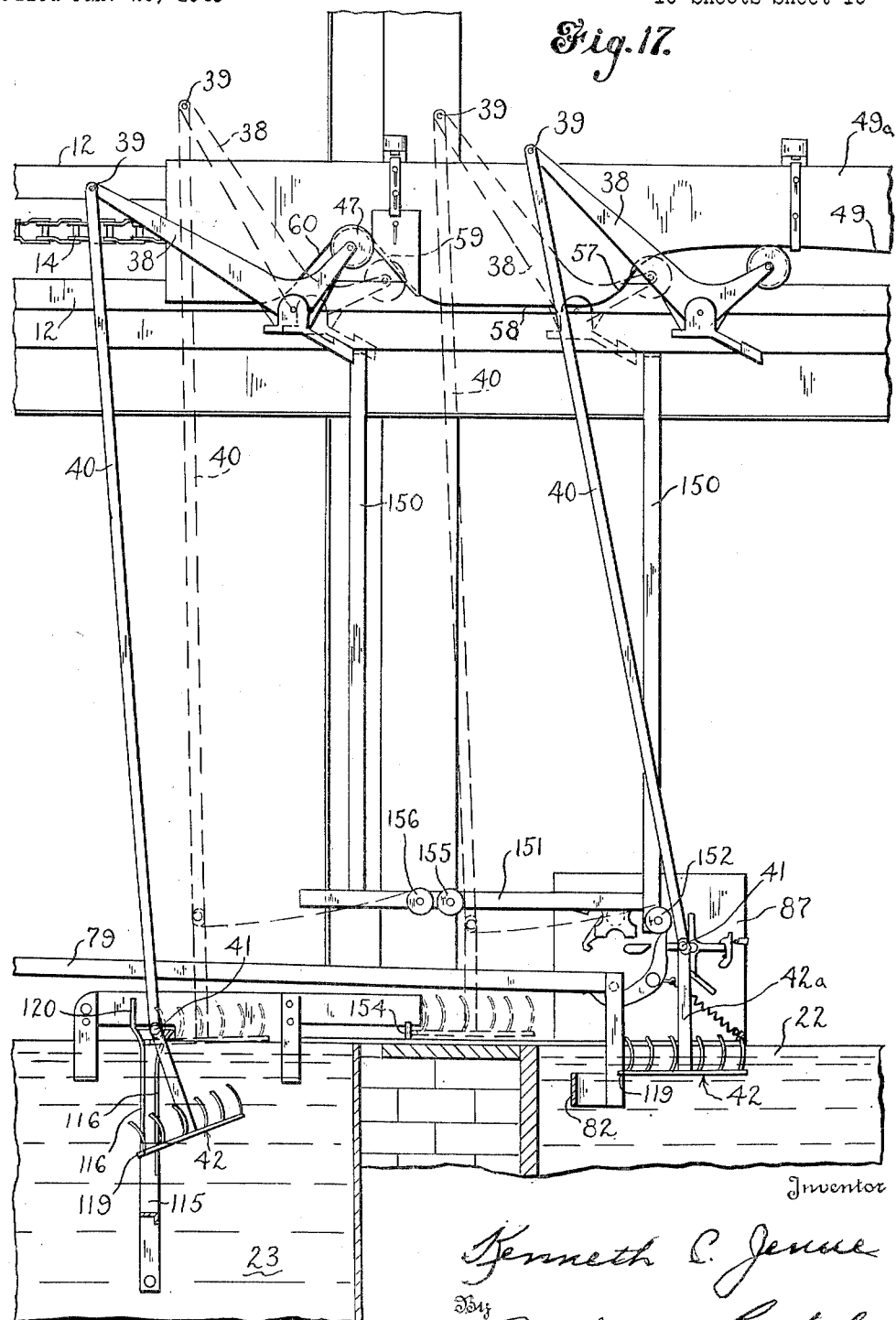

Patented Jan. 9, 1951

2,537,931

UNITED STATES PATENT OFFICE 2,537,931

MECHANISM FOR GALVANIZING

Kenneth C. Jenne, Branford, Conn., assignor to Malleable Iron Fittings Company, Branford, Conn., a corporation of Connecticut Application January 23, 1948, Serial No. 3,907

19 Claims. (Cl. 91—12.6)

This invention relates to a metal-coating apparatus, and more particularly to a device for automatically applying a coat of galvanizing to metal articles.

Many metal articles, such as pipe fittings, pole hardware, highway guard rails, cable fittings, and others too numerous to mention, are galvanized in order to prevent rusting when they are exposed to weather. It has been the custom to galvanize such articles, and particularly smaller articles, by hand as it has been difficult to reduce the process to operations which could be automatically performed by a machine.

This hand operation has been relatively expensive as the number of articles which could be galvanized by one man in a day is, of course, limited. I contemplate by the present invention the provision of a machine which will perform automatically all of the operations previously performed by hand, and, after the work has been loaded upon carriers, which are a part of the apparatus, this work may first be carried through an oven where it is thoroughly dried, then dipped into a galvanizing bath, subjected to treatment by the usual flux, removed from the bath, jarred or shaken to remove excess zinc, then vibrated or agitated vigorously previous to and while being dipped into a quenching bath, and then removed from the quenching bath and carried to a place of delivery where it is automatically dumped from the carrier, which dumping station may be adjacent the loading station, so that the empty carrier may again be loaded and the operation be completed.

The work carriers thus are caused to travel in an endless path, and the device is designed to operate with comparatively little supervision and attention, so that the few men necessary to attend to the machine can effect the galvanization of many times the quantity of the work which could be effected by the same number of men performing the galvanizing operations by hand.

One object of the present invention is to provide a new and improved machine for automatically applying a protective coat to metal articles.

A further object of the invention is to provide an apparatus which may be employed to automatically effect the galvanization of metal articles in a manner simulating the process ordinarily carried out by hand.

A still further object of the invention is to provide a device for galvanizing metal articles, the device including an endless chain suitably supported and actuated, so that work carriers mounted on this chain will be caused to travel in an endless path, and to provide means for causing these carriers to dip the work in the galvanizing bath and the quenching bath as is necessary and perform the other operations necessary to the galvanizing process.

A still further object of the invention is to provide a galvanizing apparatus of the type described above, such that the work, when loaded upon carriers mounted upon an endless chain, will be subjected to the galvanizing process, and thereafter the galvanized articles will be automatically dumped at a point of delivery, so that the carriers may again be loaded for a subsequent operation.

Still another object of the invention is to provide a galvanizing apparatus of the character described above wherein all of the operations necessary to the proper galvanizing of metal articles are carried out automatically by the apparatus with a minimum of labor on the part of the attendants.

To these and other ends the invention consists in the novel features and combinations of parts to be hereinafter described and claimed.

In the accompanying drawings:

Fig. 3 is a top plan view of the apparatus;

Fig. 4 is an end elevational view of the apparatus;

Fig. 5 is a detail elevational view of the skimming and vibrating apparatus, looking in the direction of the arrows 5—5 on Fig. 4;

Fig. 6 is a top plan view of the parts of the apparatus shown in Fig. 5;

Fig. 7 is a sectional view on line 7—7 of Fig. 6;

Fig. 8 is the wiring diagram of the driving motor for the skimming and vibrating apparatus;

Fig. 9 is an enlarged detail sectional view on line 9—9 of Fig. 6;

Fig. 10 is a sectional view on line 10—10 of Fig. 9;

Fig. 11 is an enlarged detail sectional view on line 11—11 of Fig. 3, showing the mounting of the work carriers on the endless chain;

Fig. 12 is a sectional view on line 12—12 of Fig. 11;

Fig. 13 is an enlarged detail view of the work carrier brackets and associated cam track shown near the right-hand end of Fig. 1;

Fig. 14 is a view similar to Fig. 13, showing that part of the apparatus adjacent the central portion of Fig. 1;

Fig. 15 is a sectional view through the dumping apparatus on line 15—15 of Fig. 4;

Fig. 16 is a transverse sectional view of the dumping apparatus on line 16—16 of Fig. 15;

Fig. 17 is an enlarged detail elevational view looking in the direction of the arrows 17—17 on Fig. 4;

Fig. 18 is a detail sectional view on line 18—18 of Fig. 13;

Fig. 19 is a detail sectional view on line 19—19 of Fig. 13; and

Fig. 20 is a detail sectional view on line 20—20 of Fig. 13.

Figure 1:
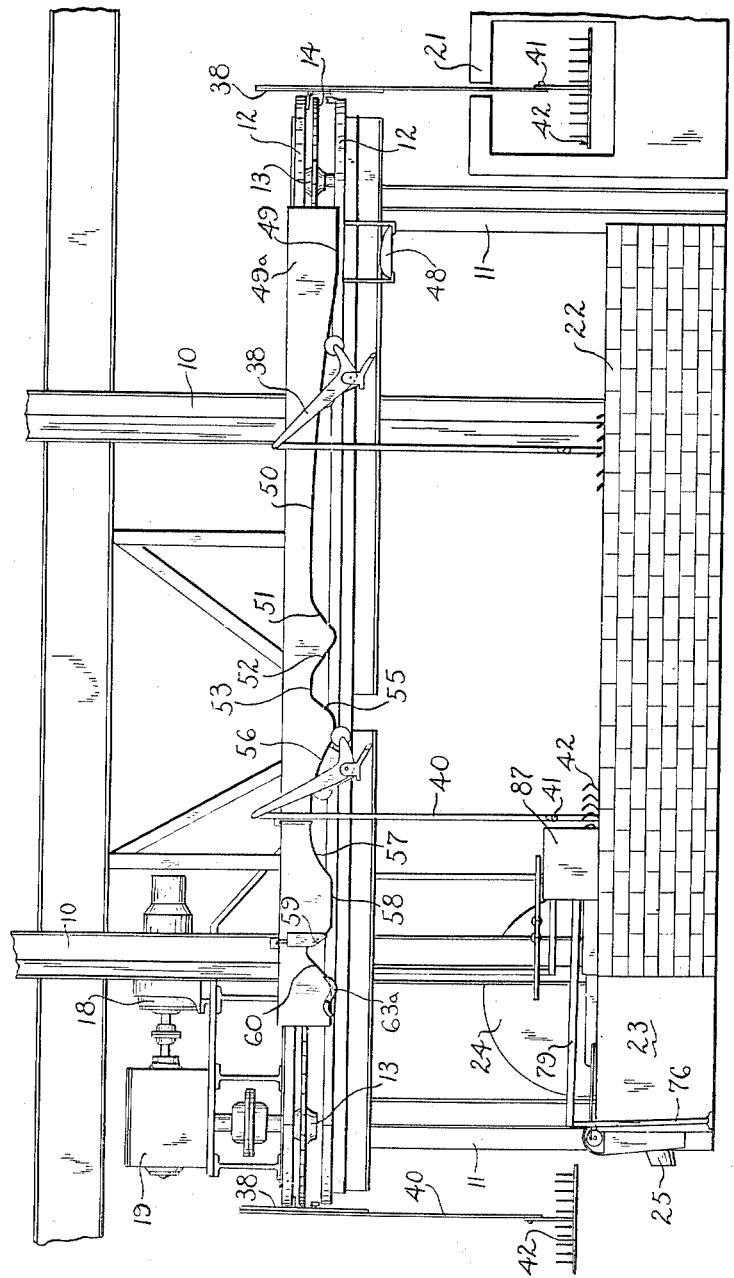
Fig. 1 is a front elevational view of the apparatus embodying my invention, the front of the device being considered that on which the galvanizing tank is located.

The device which I have shown to illustrate and describe as a preferred embodiment of my invention comprises supporting frame members 10 and 11 upon which are carried a pair of horizontally arranged supports 12 of substantially rectangular shape, as shown in plan view in Fig. 3. Adjacent each of three corners of this rectangular frame is rotatably mounted a sprocket wheel 13 around which is trained an endless chain 14. At the fourth corner of the frame formed by the members 12, sheaves or idler rollers 15 are rotatably mounted, between which is an adjustable roller 16, which may be adjusted by the screw 17 to regulate the tension upon the chain.

The chain is driven by a motor 18 (Fig. 1) through suitable reducing gearing 19, so that it will be moved at the proper speed. As will be explained hereinafter, upon the chain are mounted carrier members to carry the articles to be galvanized, so that these carrier members travel in a substantially rectangular path, so that they may be loaded and then traverse a drying oven, a galvanizing bath, a quenching bath, and, lastly, the articles dumped therefrom so that the members may be again loaded.

Figure 2:
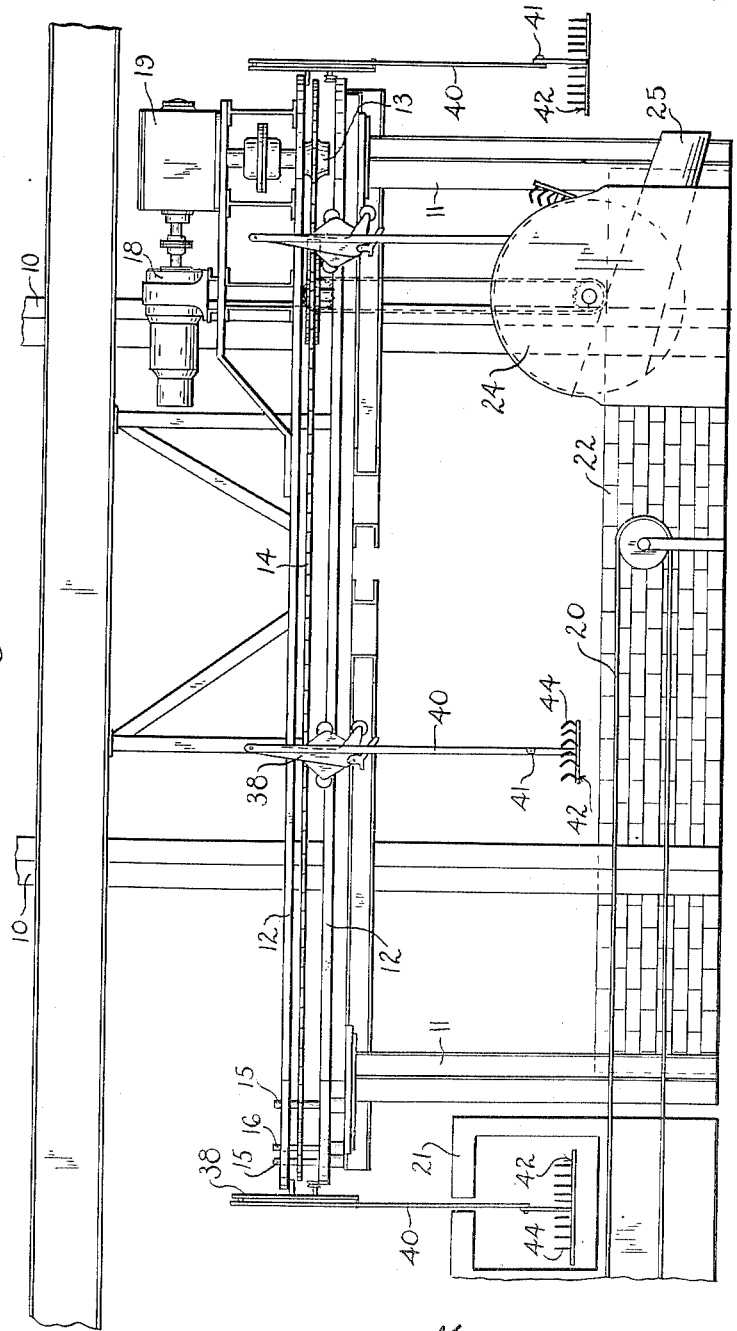
Fig. 2 is a side elevational view at the side opposite that shown in Fig. 1, this being the rear side of the device, or that upon which the loading of the carriers is effected.

As shown more especially in Figs. 2 and 3, a loading table comprising an endless belt 20 is mounted below the chain 14 at one side of the device. It is contemplated that the articles to be galvanized will be delivered to this belt and carried by it toward the right, as shown in these figures, so that they may be loaded upon the work-carrying members supported by the chain, which, as will be later explained, travel in the opposite direction.

Adjacent one end of the frame of the apparatus is a drying oven 21 through which the articles to be coated are carried, so that they may be thoroughly dried before they reach the galvanizing bath shown at 22 (Figs. 1 and 3), the chain 14 traveling in a clockwise direction, as shown in Fig. 3. Adjacent the end of the galvanizing bath 22 is a quenching bath 23 in which the articles are dipped and also vibrated, as will be later explained, and from this point they are carried to a dumping device designated generally by the numeral 24 (Fig. 2), where they are dumped into a chute 25 from which any desired deposition may be made of them. The parts of the apparatus which have been described generally above will now be described in detail.

As shown more especially in Figs. 11 and 12, a bracket 28 is mounted upon the chain 14 by a pin 29, and rotatably carried by this bracket are a pair of supporting grooved rollers 30 which ride upon an endless track 31 provided upon the lower of the rectangular frame members 12. Upon the upper of the rectangular frame members 12 is a guide track 32 in which is received a roller 33 rotatably mounted on a vertical axis upon the bracket 28, so that this bracket will be supported from below by the track or rail 31 and will be held against sidesway by the roller 33 snugly engaged in the U-shaped track 32.

Secured to, or formed integrally with, the bracket 28 is an inclined member 34 from which projects laterally a stop 35, it being understood that the bracket 28 and member 34 are held substantially rigidly by the rollers 30 and 33.

Pivoted upon a pin 37 secured to the bracket member 28 is an upwardly projecting arm 38, to the upper end of which is pivoted at 39 a work-carrying member 40 which depends from its pivot. To the lower ends of these members 40 are pivoted at 41 the work-holding baskets 42, so that the latter may swing about a horizontal axis to be dumped. These baskets may be of any suitable form, but, as shown, they consist of frame members 43 having upwardly projecting prongs 44 thereon upon which the articles may be placed when these members are positioned over the endless belt 20.

The work-carrying members 40 are shown in Fig. 12 in what may be termed their inoperative position. That is to say, this is the position occupied by the parts when the work baskets 42 are being carried around the frame in a raised position in which they would not be immersed in the galvanizing bath. This is the position, however, in which these members are carried above the endless belt 20 when the work baskets 42 are loaded, and also the position the members 40 occupy when they pass through the drying oven 21, and the position they occupy when they pass from the quenching bath 23 to the dumping device 24. In this position, as shown in Figs. 11 and 12, the pivot point 39 is beyond center with respect to the pivot pin 37, and thus the arm 38 would tend, by the weight of the parts, to rotate about the pin 37 in a counterclockwise direction. Such rotation, however, is prevented by contact of the arm 40 with the stop 35, so that the parts will be carried about the frame in this position until the arm 38 is moved in a clockwise direction to a sufficient extent to cause the point 39 to pass a dead center position directly above the pivot 37.

When it is desired to immerse the articles in the galvanizing bath, it is necessary to effect sufficient rotation of the arm 38 about the pivot 37 in a clockwise direction, as shown in Fig. 12, until the arm 38 will tend to rotate by gravity. For this purpose, the arm 38 is provided with a foot portion 46 (Fig. 12), which carries a roller 47, and, as will be shortly explained, a cam is provided on the lower frame member 12 to contact this roller and move it upwardly, as shown in Fig. 13, so as to throw the point 39 to the right and beyond a dead center position with respect to the pivot 37, thus moving the arm 38 to a point from which it would continue its rotation in a clockwise direction due to the weight of the work-carrying member 40.

This cam is shown at 48 in Fig. 13, and, as shown, the cam is inclined in an upward direction toward the left, or in the direction in which the chain 14 moves, so that, when the roller 47 rides up upon the cam 48, the arm 38 will be moved to an over-balanced position, thus tending to cause the work-carrying member to drop downwardly.

When the pivot point 39 passes beyond a dead center position with respect to the pivot pin 37, and the work-carrying member 40 drop downwardly, the roller 47 engages the cam track 49, which comprises the lower edge of a plate 49ᵃ carried by the upper frame member 12. The shape of this cam track 49 against which the roller 47 is held by the weight of the member 40 and associated parts will thus determine the position of the basket 42 and the articles to be coated which are carried thereon.

It will be understood that the cam 48 and the leading end of the cam 49 are, as shown in Fig. 1, located at the forward end of the galvanizing bath 22, so that, as the work-carrying members approach the bath, the rollers or cam followers 47 will be moved upwardly into engagement with the cam track 49. This cam track is substantially horizontal for a short distance, and, thereafter, is gradually inclined upwardly, as shown at 50, thus permitting the rollers 47 to rise and the arm 38 and work-carrying members 40 to dip, so that the work is gradually immersed in the galvanizing bath.

The depth of immersion and the duration thereof may, of course, be regulated by the shape of the track 50. As shown, the immersion continues until the cam track 50 dips downwardly sharply, as shown at 51. When the cam roller 47 comes into contact with the portion 51 of the track, the roller is depressed, thus raising the work-carrying member 40 and lifting the work from the bath through the flux, which is on the top of the bath. After the work has been through the flux, it is again dipped into the bath by the upwardly inclined portion 52 of the cam track, and, after being carried along through the bath by the substantially horizontal portion 53, is again raised from the bath through the flux by the inclined portion 55 and again immersed in the bath by the upwardly inclined portion 56, and finally raised from the bath at the end thereof by the downwardly inclined track portion 57.

The cam roller 47 is then guided horizontally by the portion 58 of the cam track 49 for a purpose which will be hereinafter explained, after which the arm 40 is again lowered by the inclined portion 59, so that the work is immersed in the quenching bath 23 and raised from this bath by the downwardly inclined portion 60 of the track 49. The galvanizing process is now complete, and it is necessary to carry the work to the dumping device 24. For this purpose, the cam roller 47 should be thrown downwardly out of engagement with the controlling cam above it and moved to the position shown in Fig. 12, where the pivot point 39 has been carried beyond dead center position, and the parts are held in stable equilibrium by engagement with the member 40 with the stop 35.

This is effected by the parts shown at the left of Fig. 14. Pivoted at 62 to the cam plate 49ᵃ is an S-shaped member 63ᵃ, having a rear end 63 and a forward end 64, which member lies in position to strike the roller 47 and also lies in position to be engaged by the hub 38ᵃ (Fig. 11) of the arm 38. When the work is finally withdrawn from the quenching bath by the inclined surface 60 of the cam 49, the S-shaped member 63ᵃ has been moved into its dotted-line position by the hub 38ᵃ, so that the cam roller 47 rides below this member on the lower edge of the plate 49ᵃ. The forward end 64 of the pivoted member 63ᵃ is in its lower position, as shown in Fig. 14, and, as the bracket 28 travels forwardly, the end 64 of the pivoted member is engaged by the hub 38ᵃ and moved forwardly, thus moving the rear end 63 to the full-line position shown in Fig. 14, so that this end 63 engages the roller 47 and moves it downwardly, thus throwing the arm 38 past dead center position to the other side of a vertical plane through the pivot 37. In this position, the work-carrying member 40 strikes the stop 35, so that the member 40 is held in a stable position during the travel across the end of the frame to the dumping device 24.

When the work is finally withdrawn from its immersion in the galvanizing bath, it is desirable that it not be withdrawn through the flux. Therefore, a skimmer is provided to skim the bath just prior to the withdrawal of the work therefrom. This withdrawal, as stated, is effected by the cam surface 57, and, from Figs. 1 and 14, it will be noted that, just prior to the time when the roller 47 reaches the inclined cam portion 57, the roller engages a switch member 68 slidably engaged with the plate 49ᵃ by the pin and slot connections 69, this switch member, when moved upwardly, striking a cooperating member 70 which serves to close an electric circuit through the motor 71 (Fig. 5). The shaft 72 of this motor drives a crank 73 through reduction gearing 74, this crank being connected by a pitman 75 to an arm 76 secured to a shaft 77 rotatably mounted in brackets 78. At the other end of the shaft 77 is a similar arm 76 (Fig. 6), and extending forwardly from each of the arms 76, and pivoted thereto at 76ᵃ, is a link 79. A pin 80 connects the forward ends of each of the arms 79 with a vertical link 81, and to the links 81 are connected the ends of a somewhat U-shaped skimmer bar 82. As shown in Figs. 9 and 10, this skimmer bar is normally immersed in the bath. It will be apparent, therefore, that, as soon as the motor 71 is placed in operation by the closing of the switch at 70, the arms 76 will be caused to rock about their pivots 77, thus moving the skimmer bar 82 rearwardly and forwardly.

As the skimming movement of the skimmer bar should take place along the surface of the galvanizing bath, and as it is desirable to maintain the skimmer bar normally immersed in the bath, it is necessary to raise the bar at the beginning of its movement and thereafter move it in an oscillatory path. This is effected by the mechanism shown in Figs. 9 and 10, where, as illustrated, a projecting roller 84 is provided at the forward end of the arm 79, which roller rides upon the upper edge of the arm 85 of a bell-crank lever pivoted at 86 to a plate 87 secured to the frame of the machine. To the other arm 88 of the bell-crank lever is connected a tension spring 89 connected to the plate 87 at 90 so as to tend to rock the bell-crank lever in a counter-clockwise direction. This lever will normally be held in the position shown in Fig. 9 by the weight of the skimmer bar and associated parts. When, however, the link 79 moves forwardly, as actuated by the motor 71, the boss 84 rides along the upper edge of the arm 85 and, striking the arm 88, moves the bell-crank lever to its dotted-line position shown in Fig. 9 in which the arm 88 moves against the upper forward edge of a stop 91. This causes the roller 84 to contact one of the arms 92 of a four-arm wheel rotatably mounted at 93 on the plate 87 and rotate this wheel through a quarter revolution, the roller 84 then resting on one of the succeeding arms 92, as shown in the position indicated at 84ᵃ. In this position, the weight of the roller 84 and associated parts cannot move the arm 92 in a clockwise direction as one of the other arms of this wheel will be engaged by a detent 95 pivoted at 96 to the plate 87 and spring pressed toward the four-arm wheel by the spring 97.

When the roller 84 reaches a position 84ª, the arm 79 will be drawn rearwardly or toward the right, thus moving the roller 84 along the horizontal arm 92 of the four-arm wheel and along the upper edge of a guide plate 99 secured to the support 87. The roller 84 passes over the upper edge of the plate 99, and, when it reaches the right-hand end of this plate, drops to the position shown at 84ᵇ where it again rests upon the upper edge of the arm 85 of the bell-crank lever, which is now in its dotted-line position.

When the roller 84 passes over the upper edge of the plate 99, it contacts one of the arms 100 of a second four-arm wheel 101 and moves this wheel through one-fourth of a revolution before the roller drops from the plate 99. This wheel 101 is pivoted to the plate 87 at 102, and, upon its rear side, is a cam hub 103 having a flattened face 104 which contacts a holding pawl 105 pivoted to the plate 87 at 106. This holding pawl has a tooth 107 designed to catch below a projection 108 on the arm 85 of the bell-crank lever so as to hold this lever in the upper or dotted-line position shown in Fig. 9.

Normally the tooth 107 is held in an inoperative position by a spring-pressed switch plunger 110 slidably carried by the plate 87. It has already been described that, upon the first forward movement of the arm 79, the bell-crank lever is moved to its dotted-line position, shown in Fig. 9, thus raising the projection 108 in position to be engaged by the pawl 105. The spring 89 holds the bell-crank lever in this position while the roller 84 moves rearwardly over the plate 99 and turns the wheel 101 through an angle of 90°. This moves the flat side of the cam hub 103 away from the pawl 105 and cams this pawl to its dotted-line position in which the tooth 107 engages below the projection 108. The pawl will remain in this position and hold the bell-crank lever 85 in its upper position until the flat side of the cam hub 103 again permits the pawl 105 to return to its original position against the flat side of the cam, at which time the bell-crank lever will drop to its full-line position. With this arrangement, the skimmer makes four complete oscillations each time it is actuated by the closing of the switch contact 70.

It will be apparent that the switch bar 68 is held in a raised position only momentarily and not a sufficiently long time to energize the motor 71 to move the skimmer bar through four complete oscillations. In order to keep the motor energized, a holding switch is employed, which holding switch is shown at 111 on Fig. 9 and is actuated by the spring-pressed rod 110. The switch member 68 is kept in contact with the switch contacts 70 sufficiently long for the roller 84 to make substantially one complete oscillation and move the wheel 101 through 90°, so as to move the pawl 105 in a clockwise direction and, therefore, move the rod 110 to the right, as shown in Fig. 9, and close the contacts at 111. This keeps the motor 71 energized until, at the end of the fourth oscillation of the link 79, the flat side of the cam 103 is again opposite the pawl 105, thus allowing the rod 110 to be moved outwardly or toward the left by its spring and opening the switch, thus stopping the skimmer. A brake mechanism of any approved form, shown at 112 on Fig. 5, may be employed on the shaft of the motor 71 to stop the skimmer immediately upon the opening of the switch 111.

Pivoted at 114 upon each side wall of the quenching tank 23 is an oscillating arm 115 having laterally extending guide flanges 116 adjacent its upper end, so as to form between them a guide channel open at its lower end. As the work baskets reach the position over the guide channels formed by the flanges 116, the projecting rods 119 on these baskets strike against the upper extended ends 120 of the further flanges 116 and guide these rods into the channels between the flanges. At this time, the cam roller 47 is traveling over the inclined cam surface 59, and thus the work holder is allowed to drop between the flanges 116, thus immersing the work in the quenching bath. When the rod ends 119 reach the lower open end of the channel 116, they move out of this channel and forwardly again so that they may be raised from the quenching bath by the inclined surface 60 of the cam plate 49ª.

Means are provided for vibrating the work holder as it enters the quenching bath and as long as the rods 119 remain in the channels between the flanges 116. This is effected by movement of the oscillating arms 115 which are connected by the cross member 122. To one of the arms 115, as shown in Fig. 7, is connected a pitman 123, this pitman being secured eccentrically to a crank disk 124, which disk is driven by a chain 125 from a motor 126 (Figs. 5 and 7). The motor 126 is energized by the switch contact member 127 movably secured on the cam plate 49ª. To the lower end of the member 127 is secured a relatively broad plate 128 adapted to be engaged by the cam roller 47, so that the member 127 is held in a raised or operative position for a sufficiently long period to effect vibration of the members 115 during the time that the work is traveling down the guideway between the flanges 116. The member 127, shown more especially in Fig. 14, when it is raised, makes contact with the switch member 130 to energize the motor 126.

After the work holders have been raised from the quenching bath by the portions 60 of the cam track, and the arms 38 have been moved past a dead center position as previously described, so that the work carrier will be held in a stable position, the cam roller 47 rides off the cam plate 49ª, and the work holder is carried across the end of the machine to the dumping apparatus 24, shown in detail in Figs. 15 and 16. It has already been explained that the work baskets 42 are pivoted to the members 40 at 41, so that they may swing upwardly about a horizontal axis to inverted position to allow the articles to fall from the pins 44.

The dumping device 24 comprises a shaft 135 rotatably mounted in standards 136. Secured upon the shaft 135 are toothed wheels 137, these wheels being mounted without the standards 136, and are rigidly secured to the shaft 135, so as to be rotated therewith when the latter is rotated by means of the chain 138 from any suitable source of power. It will be understood that the driving of the shaft 135 will be timed with the travel of the chain 14, so that, when the work baskets reach the dumping apparatus, one of the teeth 139 on each of the wheels 137 will engage below the projecting ends of the rods 119 and carry the work baskets upwardly around the toothed wheels 137 until they are inverted, as shown in dotted-line position in Fig. 15. At this time, the articles upon the pins 44 drop into the chute 25, which is mounted between the standards 138, and are delivered by the chute to any desired point of delivery.

In order that the rods 119 may be caught evenly at each side of the device by the teeth 139, an arm 140 is pivoted to each of the standards 136 at 141, the two arms being connected by the stirrup member 141ᵃ so that they will swing together. The free end of each of the arms 140 is provided with a recess 140a to receive the rods 119. The arms 140 normally rest against the stops 140ᵇ. The movement of the work racks by the chain 14 causes the rods to slide up upon the edges of the standards 136 and drop into the recesses 140ᵃ. The continued movement of the racks causes the arms 140 to swing about their pivots to substantially the dotted-line position shown in Fig. 15, at which time the rods 119 will be deposited upon the upper edge of one of the teeth 139.

On the upper edges of the frame members 136 projections or teeth 142 may be provided over which the rod ends travel, so as to agitate the work baskets and loosen any of the pieces of work which might otherwise cling to the pins 44.

It may sometimes occur that one of the work baskets or racks 42 will not be filled as it passes the loading table. The arm 38, however, carrying this rack would normally be thrown in a counterclockwise direction by the cam 48, so that the work rack would be lowered into the bath by cam 49, which would, of course, be undesirable when there was no work on the rack. As shown more especially in Figs. 13, 14 and 18, I have provided means for throwing the arm 38 in a rearward direction past its pivot to a stable position in which it will be carried idly around the frame.

A U-shaped member 144 is pivoted on the frame about a horizontal axis, as at 145, this member carrying a roller 144ᵃ upon one of its arms, which stands in a position to contact the arm 38. To the other arm of this member 144 is secured a cable 146 which passes over guide sheaves and carries upon its end a weight 147, shown at the left-hand side of Fig. 14. With this construction the weight normally tends to hold the lever in the position shown in Fig. 19, but will permit this arm to swing upwardly when the effect of the weight is overcome, so that the arm 38 may pass below the roller 144ᵃ.

Normally when the work baskets or racks 42 are loaded the weight of these loaded racks is sufficient to overcome the weight 147, and thus when the arm 38 strikes the member 144 the latter will be swung about its pivot 145 and permit the arm 38 to pass. However, when the work racks 42 are empty, the weight 147 will not be overcome, and the member 144 will throw the arm 38 rearwardly to its stable position past dead center, as shown at the right-hand side of Fig. 13. In this position the arm 38 cannot move further in a clockwise direction, and its pressure on the stop member 144 will move the latter against the effort of the weight 147, so that the arm 38 will pass below this member, and the work rack will be carried about the frame idly for the rest of its journey.

Checking means for retarding the movement of the member 144 may be provided in the form of a cylinder 149, within which operates a piston 149ᵃ connected to the member 144, this device merely serving to check or damp the movements of the member 144.

It is also desirable that the work baskets or racks be jarred sharply after the work is removed from the galvanizing or coating bath, so as to shake off any excess of the coating material which may adhere thereto. The mechanism for this purpose is shown principally in Fig. 17. Secured to the lower of the frame members 12 is a frame comprising vertical members 150 and a horizontal member 151. Upon the latter is rotatably mounted a roller 152 in position to engage the depending work-carrying member 40, but which will not engage the pivoted handle 42ᵃ of the basket. It will be understood that the member 40 usually hangs vertically from the pivot point 39. When the member 40 reaches a position in which it contacts the roller 152, the lower end of this member is retarded while the pivot point 39 continues to travel forwardly, as shown at the right-hand side of Fig. 17. This will cause the lower end of the member 40 to travel upwardly over the roller 152 until it is finally disengaged therefrom, which will occur when the pivot point 39 reaches the dotted-line position of the parts shown at the right-hand side of Fig. 17. When the arm 40 rides out of engagement with the roller 152, it will be released and will swing forwardly under gravity so as to tend to assume a vertical position. At this time, the rods 119 upon the work baskets or racks 42 will strike against bump posts 154 mounted between the coating bath and the quenching bath, which will serve to jar the work violently and cause excess zinc to drop therefrom.

The member 40 is, at this time, approximately in the dotted-line position shown at the right-hand side of Fig. 17, and this member lies against the roller 155 also rotatably mounted on the horizontal member 151. As the arm 38 is caused to travel further to the left, the member 40 is held back by the roller 155, but finally clears this roller and lodges momentarily against the roller 156 mounted on the member 151. Upon continued travel of the arm 38, the arm 40 clears roller 156, which occurs about the time that the arm 38 is in the dotted-line position, shown at the left-hand side of Fig. 17. When the arm 140 clears the roller 156, it again moves forward suddenly under the influence of gravity and the members 119 strike against the upper ends 120 of the flanges 116, thus again jarring the work rack so as to again shake off any excess zinc which may adhere to the work carried by the rack.

As shown more especially in Figs. 13 and 20, the cam 48 is so supported that it may be moved from the path of the cam rollers 47 so that the roller will not be thrown into engagement with the cam 49. The cam 48, as shown, is part of an L-shaped member 160 which is slidably supported in a U-shaped bracket 161 (Fig. 20) secured to the lower of the frame members 12. A tension spring 162, one end of which is connected to the bracket 161 and the other connected to the member 160, normally holds cam 48 in its operative position, or the full-line position shown in Fig. 20. A cord or cable 163 is secured to the member 160, this cord passing over a pulley 164, to be led to any convenient place where it may be actuated by the operator to pull the cam 48 to its dotted-line position, and thus out of the path of the cam rollers 47, so that the latter will not be thrown upwardly into engagement with the cam 49, and the work carriers will be carried idly around the frame. Thus at any time the operator may prevent the dipping of the articles in the bath without stopping the movement of the endless chain.

While I have shown and described a preferred embodiment of my invention, it will be understood that it is not to be limited to all of the de-

What I claim is:

1. A molten metal coating apparatus comprising an endless chain, means operatively supporting and driving said chain, a plurality of brackets secured to the chain, an upwardly extending arm pivoted to each bracket to swing in a vertical plane and having a free end, a work-carrying member pivoted at its upper end to the free end of each arm and depending freely from its pivot in a substantially vertical position, and means to move the free end of each arm to a position at one side of a vertical plane through its pivot point with the bracket and hold it in said position.

2. A molten metal coating apparatus comprising an endless chain, means operatively supporting and driving said chain, a plurality of brackets secured to the chain, an arm pivoted to each bracket to swing in a vertical plane and having a free end, a work-carrying member pivoted at its upper end to the free end of each arm and depending freely from its pivot in a substantially vertical position, means to move the free end of each arm to a position at one side of a vertical plane through its pivot point with the bracket and hold it in said position, means to move said arm to a position in which said free end is at the other side of said last-named plane, and a cam to effect raising and lowering movements of said arm when in said last-named position.

3. A molten metal coating apparatus comprising a frame, a track supported thereon, a bracket mounted to move along said track, an arm pivoted to said bracket on a substantially horizontal axis transverse to the direction of travel of the bracket, a work-carrying member pivoted to the free end of said arm about an axis substantially parallel to said first-named axis, said member depending from its pivot point to be raised and lowered in a substantially vertical plane by the swinging of said arm, a roller carried by said arm, and a cam track engaging said roller to control the position of the arm.

4. A molten metal coating apparatus comprising a frame, a track supported thereon, a bracket mounted to move along said track, an arm pivoted to said bracket on a substantially horizontal axis transverse to the direction of travel of the bracket, a work-carrying member pivoted to the free end of said arm about an axis substantially parallel to said first-named axis, said member depending from its pivot point to be raised and lowered in a substantially vertical plane by the swinging of said arm, a roller carried by said arm, a cam track engaging said roller to control the position of the arm, and means engaging said roller to move the arm about the pivot and move said roller into engagement with said cam track.

5. A molten metal coating apparatus comprising a frame, a track supported thereon, a bracket mounted to move along said track, an arm pivoted to said bracket on a horizontal axis transverse to the direction of travel of the bracket, a depending work-carrying member pivoted to the free end of said arm about an axis substantially parallel to said first-named axis and depending downwardly therefrom so as to move in a substantially vertical plane, a roller carried by said arm, a cam track engaging said roller to control the position of the arm, and means for holding said roller out of engagement with said cam track.

6. A molten metal coating apparatus comprising a frame, a track supported thereon, a bracket mounted to move along said track, an arm pivoted to said bracket on a substantially horizontal axis transverse to the direction of travel of the bracket, a work-carrying member pivoted to the free end of said arm about an axis substantially parallel to said first-named axis and depending from its pivot point, a galvanizing bath, means for moving said brackets along said track, and cam means to effect gradual lowering of said work-carrying member to dip the work gradually into said bath.

7. A molten metal coating apparatus comprising a frame, a track supported thereon, a bracket mounted to move along said track, an arm pivoted to said bracket on a substantially horizontal axis transverse to the direction of travel of the bracket, a work-carrying member pivoted to the free end of said arm about an axis substantially parallel to said first-named axis and depending from its pivot point, a galvanizing bath, means for moving said brackets along said track, cam means to effect gradual lowering of said work-carrying member to dip the work gradually into said bath, and means to thereafter quickly raise said work from the bath and return it thereto.

8. A molten metal coating apparatus comprising a frame, a track supported thereon, a bracket mounted to move along said track, an arm pivoted to said bracket on a substantially horizontal axis transverse to the direction of travel of the bracket, a work-carrying member pivoted to the free end of said arm about an axis substantially parallel to said first-named axis and depending from its pivot point, a galvanizing bath, means for moving said brackets along said track, and cam means to repeatedly raise and lower said work-carrying member through the surface of the bath.

9. A molten metal coating apparatus comprising a frame, a track supported thereon, a bracket mounted to move along said track, an arm pivoted to said bracket, a work-carrying member pivoted to the free end of said arm, a galvanizing bath, means for moving said brackets along said track, cam means to lower said work into the bath and raise it therefrom, skimming means mounted on the frame to skim the surface of the bath adjacent the point of exit of the work, a motor actuating said skimming means, and means actuated by the travel of said arm to energize said motor.

10. A molten metal coating apparatus comprising a frame, a track supported thereon, a bracket mounted to move along said track, an arm pivoted to said bracket, a work-carrying member pivoted to the free end of said arm, a galvanizing bath, means for moving said brackets along said track, cam means engaging said arm to lower said work into the bath and raise it therefrom, skimming means mounted on the frame to skim the surface of the bath adjacent the point of exit of the work, a motor actuating said skimming means, a motor-controlling switch adjacent said cam means, and means on said arm to engage and actuate said switch.

11. A molten metal coating apparatus comprising a frame, a track supported thereon, a bracket mounted to move along said track, an arm pivoted to said bracket, a work-carrying member pivoted to the free end of said arm, a galvanizing bath, means for moving said bracket along the track, means to lower the work carried by said member into the bath and raise it therefrom, including a cam track and a follower on said arm to engage said cam track, skimming means for the bath mounted on the frame, a motor to actuate said skimming means, and a motor-controlling switch mounted on the frame for engagement and actuation by said follower.

12. A molten metal coating apparatus comprising a frame, a track supported thereon, a bracket mounted to move along said track, an arm pivoted to said bracket, a work-carrying member pivoted to the free end of said arm, a galvanizing bath, means for moving said bracket along the track, means to lower the work carried by said member into the bath and raise it therefrom, including a cam track and a follower on said arm to engage said cam track, skimming means for the bath, means to intermittently actuate said skimming means, said means comprising a motor and a motor-controlling switch supported adjacent the cam track and actuated by said follower, and means actuated by the movement of said skimming means to de-energize said motor.

13. A molten metal coating apparatus comprising a frame, a track supported thereon, a bracket mounted to move along said track, an arm pivoted to said bracket a work-carrying member pivoted to the free end of said arm, a work holder pivoted to said work-carrying member, a coating bath, means for effecting travel of the bracket along said track and dipping the work in the bath, and means for tipping said work holder about its pivot to dump the work after it leaves the bath.

14. A molten metal coating apparatus comprising a frame, a track supported thereon, a bracket mounted to move along said track, an arm pivoted to said bracket, a work-carrying member pivoted to the free end of said arm, a work holder pivoted to said work-carrying member, a coating bath, means for effecting travel of the bracket along said track and dipping the work in the bath, and rotatable means to engage said work holder after the latter leaves the bath and tip the holder to dump the work therefrom.

15. In a molten metal coating apparatus comprising, a frame, an endless chain movably mounted thereon, work-holding members supported on said chain in depending relation thereto, a coating bath, a quenching bath, both of which are supported below the chain, means for moving said chain to carry said members along the frame, means to lower said members into each of said baths and raise them therefrom, and means to vibrate said members as they are immersed in the quenching bath, said means comprising a channel element into which a part of each of said members is received and means for rocking said channel element.

16. In a molten metal coating apparatus comprising, a frame, an endless chain movably mounted thereon, work-holding members supported on said chain, a coating bath, a quenching bath, both of which are supported below the chain, means for moving said chain to carry said members along the frame, means to immerse said members in said baths and raise them therefrom, and means to vibrate said members as they are immersed in the quenching bath, said vibrating means being intermittently actuated and comprising a channel element in which a part of each of said members is received and means for rocking said channel element.

17. In a molten metal coating apparatus comprising, a frame, an endless chain movably mounted thereon, work-holding members supported on said chain, a coating bath, a quenching bath, both of which are supported below the chain, means for moving said chain to carry said members along the frame, means to immerse said members in said baths and raise them therefrom, and means to vibrate said members as they are immersed in the quenching bath, said vibrating means being set into operation intermittently by movement of the work-holding members around the frame and comprising a channel element in which a part of each of said members is received and means for rocking said channel element.

18. In a molten metal coating apparatus comprising, a frame, an endless chain movably mounted thereon, work-carrying members supported on said chain and depending freely from the point of support, a coating bath, a quenching bath, both of which are supported below the chain, means for moving said chain to carry said members along the frame, means to immerse said members in said baths and raise them therefrom, means to engage and retard and then release the lower ends of said members, and means on the frame engaged by said members after their release to jar said members after their immersion in the coating bath.

19. A molten metal coating apparatus comprising a frame, a track supported thereon, a bracket mounted to move along said track, an arm pivoted to said bracket about a substantially horizontal axis extending transversely of the direction of travel of the bracket, said arm extending upwardly from its pivot point, a work-carrying member pivoted to, and depending from the free end of said arm, a roller carried by said arm, a cam track engaging said roller to control the position of the arm, means for normally positioning said roller out of engagement with said cam track, and means for moving the roller into engagement with the track to secure control of the position of the arm by said track.

KENNETH C. JENNE.

REFERENCES CITED

The following references are of record in the file of this patent:

UNITED STATES PATENTS

| Number | Name | Date |
| --- | --- | --- |
| 928,172 | Bernardin | July 13, 1909 |
| 1,925,134 | Carroll et al. | Sept. 5, 1933 |
| 2,234,586 | Bertalan | Mar. 11, 1941 |
| 2,267,273 | Garbe | Dec. 23, 1941 |